May 13, 1924.  
L. C. DRAKE  
CHASSIS  
Filed March 26, 1923  
1,493,617
Fig. 1.
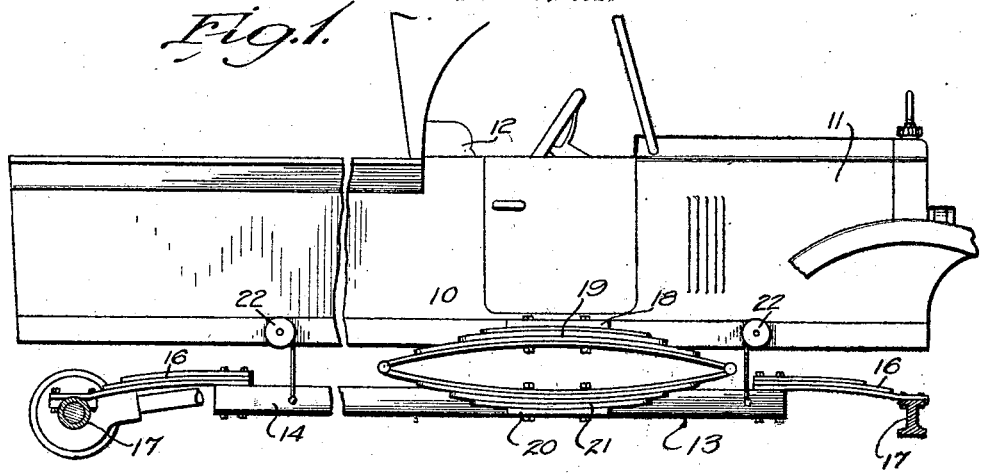
Fig. 2.
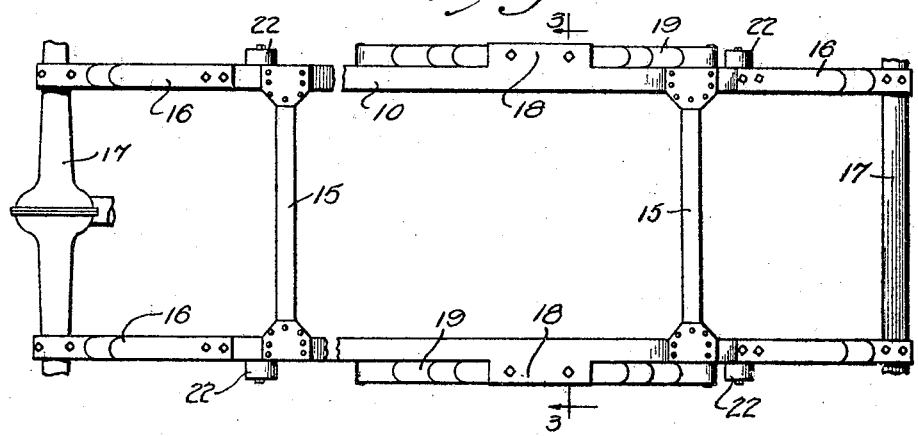
Fig. 3.    Fig. 4.
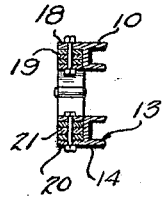 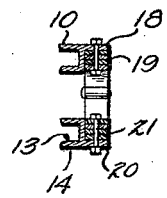 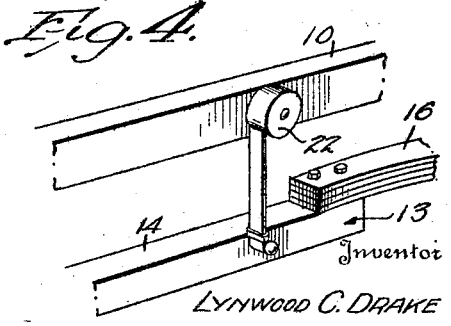
Inventor  
LYNWOOD C. DRAKE
By Watson E. Coleman  
Attorney Patented May 13, 1924.

1,493,617

UNITED STATES PATENT OFFICE.

LYNWOOD C. DRAKE, OF HANDSOM, VIRGINIA.

CHASSIS.

Application filed March 26, 1923. Serial No. 627,819.

*To all whom it may concern:*

Be it known that I, LYNWOOD C. DRAKE, a citizen of the United States, residing at Handsom, in the county of Southampton and State of Virginia, have invented certain new and useful Improvements in Chassis, of which the following is a specification, reference being had to the accompanying drawings.

This invention relates to chassis and more particularly to the mounting of the body frame of the chassis.

An important object of the invention is to provide a mounting of this character whereby the shocks imparted to the axle are to the greatest possible extent withheld from the body frame proper.

A further object of the invention is to provide a combined spring support and pivotal mounting of the body frame of a chassis upon an under auxiliary frame to which the axles of the chassis are secured.

A still further object of the invention is to provide means for checking the rotation of the body frame upon the main frame when the chassis is subjected to road shocks.

These and other objects I attain by the construction shown in the accompanying drawings, wherein for the purpose of illustration is shown a preferred embodiment of my invention and wherein:—

Figure 1 is a side elevation of a vehicle including a chassis constructed in accordance with my invention;

Figure 2 is a plan view of the chassis, parts being broken away;

Figure 3 is a section on the line 3—3 of Figure 2; and

Figure 4 is a perspective of a portion of the frame.

Referring now more particularly to the drawings, the numeral 10 indicates a body frame adapted to support the usual body accessories, including the engine 11, seats 12 and the like. In accordance with my invention I provide beneath the body frame an auxiliary or axle frame 13, vertically spaced from the body frame and which includes side members 14 connected by suitable transverse members 15. The side members 14 of the axle frame are each provided at each end thereof with a longitudinally extending quarter-elliptical spring 16, the free ends of these springs being connected to the wheel axle 17 of the vehicle.

To the main or body frame 10, at the longitudinal center of balance thereof and at each side is secured a spring perch 18, to which is secured the central portion of an inverted longitudinally extending semi-elliptical spring 19. Immediately below the spring perches 18 to the axle frame 13 are secured similar spring perches 20, to which are secured semi-elliptical springs 21, the ends of the springs 19 and 21 at opposite sides of the vehicle being connected together, thus connecting the main frame 10 at the longitudinal center of balance to the axle frame 13 by means of a full-elliptical spring. Each side member of the axle frame is connected with the corresponding side member of the main frame 10 in advance and rearwardly of the spring connection between these frames by snubbers 22, preferably of the coil strap type.

It will be seen that upon a shock being applied to the axle 17 this axle will move toward the adjacent end of the main frame, with the result that the opposite end of the main and auxiliary frames will tend to separate, this separation being resisted by the springs 19 and 21 and by the snubbers 22, at that end of the frame remote from the axle to which the shock is applied. In this way the shock of the road applied to the axle is distributed between the spring 16 connecting the axle to the auxiliary frame, all four of which are brought into play, as hereinafter will appear, the springs 19 and 21 and a pair of the snubbers 22. These snubbers will tend to resist the rebound action and will insure maintenance of proper balance of the main frame 10.

It is pointed out that when a shock is applied to one of the axles 17, the springs attached to this axle will flex upwardly permitting the axle to move toward the main frame. The tension applied by these springs to the adjacent ends of the side members of the axle frame will tend to cause this frame to rotate about the spring perches 20 as a center, this tendency to rotation being resisted by the springs 16 connecting the other of the axles 17 with the axle frame, so that the major portion of the blow is imparted vertically to the frame 10 through the springs 19 and 21. It will, however, be obvious that the mounting is such that the blow or road shock will be substantially eliminated before it is imparted to the main frame and will accordingly be hardly perceptible unless particularly severe. It will furthermore be obvious that the construction hereinbefore set forth is capable of considerable modification without materially departing from the spirit of my invention and I accordingly do not limit myself to the use of the particular forms of springs or frames hereinbefore described, except, as hereinafter claimed.

I claim:—

In a chassis, a body frame, an axle frame arranged below the body frame and vertically spaced therefrom and including side members underlying the side members of the body frame, longitudinally extending springs secured at their inner ends to the ends of the side members of the axle frame and at their outer ends to the axles of the chassis, other longitudinally extending springs connecting the body frame and axle frame at the longitudinal center of balance of the body frame, and snubbers connecting said body and axle frames at opposite ends of the last named springs.

In testimony whereof I hereunto affix my signature.

LYNWOOD C. DRAKE.